United States Patent
Grasreiner

(10) Patent No.: US 9,556,802 B2
(45) Date of Patent: Jan. 31, 2017

(54) DETECTION OF COKING IN THE INTAKE TRACT OF AN INTERNAL COMBUSTION ENGINE

(71) Applicant: Bayerische Motoren Werke Aktiengesellschaft, Munich (DE)

(72) Inventor: Sebastian Grasreiner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 73 days.

(21) Appl. No.: 14/604,903

(22) Filed: Jan. 26, 2015

(65) Prior Publication Data

US 2015/0136079 A1    May 21, 2015

Related U.S. Application Data

(63) Continuation of application No. PCT/EP2013/065567, filed on Jul. 24, 2013.

(30) Foreign Application Priority Data

Jul. 27, 2012 (DE) .......................... 10 2012 213 241

(51) Int. Cl.
     *F02D 41/22*      (2006.01)
     *F02D 13/02*      (2006.01)
     (Continued)

(52) U.S. Cl.
     CPC ........... *F02D 13/0234* (2013.01); *F02B 77/04* (2013.01); *F02B 77/083* (2013.01);
     (Continued)

(58) Field of Classification Search
CPC .. F02D 13/0234; F02D 13/08; F02D 13/0238; F02D 41/08; F02D 41/22; F02D 41/1498; F02D 2041/001; F02D 2041/389; F02D 2250/00; G01M 15/042; F02B 77/04; F02B 77/083; F02B 2077/045; F02B 2075/125; Y02T 10/123; Y02T 10/18; Y02T 10/40

(Continued)

(56) References Cited

U.S. PATENT DOCUMENTS 5,263,455 A    11/1993    Iwai et al.
6,155,105 A    12/2000    Klenk et al.
(Continued)

FOREIGN PATENT DOCUMENTS

DE      38 32 338 A1    9/1989
DE    198 14 732 A1    10/1999
(Continued)

OTHER PUBLICATIONS

German Office Action dated Jun. 17, 2013 (Five (5) pages).
(Continued)

*Primary Examiner* — Hai Huynh
(74) *Attorney, Agent, or Firm* — Crowell & Moring LLP

(57) ABSTRACT

A method for detecting coking in the intake tract of an internal combustion engine having direct fuel injection is provided. The internal combustion engine has variable intake valve control. The variable intake valve control makes it possible to change the open time of the intake valves in relation to the crank angle of the crankshaft. In the method, the internal combustion engine is operated in idling mode at an idling rotational speed that is elevated in comparison with the normal idling operation. In order to perform the measurement, the open time of the intake valves is also shifted in an advanced direction. An uneven-running characteristic value of the internal combustion engine that is characteristic of the uneven running of the internal combus- (Continued)

tion engine is determined, and the presence of coking in the intake tract can be detected on the basis of the uneven-running characteristic value.

14 Claims, 3 Drawing Sheets

(51) Int. Cl.
    *F02D 41/14*     (2006.01)
    *F02B 77/08*     (2006.01)
    *F02D 41/08*     (2006.01)
    *F02B 77/04*     (2006.01)
    *F02D 13/08*     (2006.01)
    *G01M 15/04*     (2006.01)
    *F02B 75/12*     (2006.01)
    *F02D 41/00*     (2006.01)
    *F02D 41/38*     (2006.01)

(52) U.S. Cl.
    CPC ......... *F02D 13/0238* (2013.01); *F02D 13/08* (2013.01); *F02D 41/08* (2013.01); *F02D 41/1498* (2013.01); *F02D 41/22* (2013.01); *G01M 15/042* (2013.01); *F02B 2075/125* (2013.01); *F02B 2077/045* (2013.01); *F02D 2041/001* (2013.01); *F02D 2041/389* (2013.01); *F02D 2250/00* (2013.01); *Y02T 10/123* (2013.01); *Y02T 10/18* (2013.01); *Y02T 10/40* (2013.01)

(58) Field of Classification Search
USPC ... 123/339.1, 345–348, 90.15, 435; 701/103, 111; 73/35.07
See application file for complete search history.

(56) References Cited

U.S. PATENT DOCUMENTS

| | | | |
|---|---|---|---|
| 6,892,691 | B1 | 5/2005 | Uhl et al. |
| 2005/0005908 | A1 | 1/2005 | Tanei et al. |

FOREIGN PATENT DOCUMENTS

| | | |
|---|---|---|
| DE | 199 58 177 A1 | 1/2001 |
| DE | 199 45 813 A1 | 3/2001 |
| DE | 10 2004 024 161 B4 | 12/2009 |
| EP | 1 854 986 A2 | 11/2007 |
| EP | 1 884 637 A2 | 2/2008 |
| JP | 2-104945 A | 4/1990 |
| JP | 2008-175141 A | 7/2008 |

OTHER PUBLICATIONS

International Search Report (PCT/ISA/210) dated Nov. 20, 2013 with English-language translation (Four (4) pages).
Chinese Office Action issued in counterpart Chinese Application No. 201380039797.X dated Jul. 4, 2016 with English-language translation (ten (10) pages).
Decision of Grant issued in counterpart German Application No. 10 2012 213 241.4 dated Sep. 29, 2016, with English translation (seventeen (17) pages).

DETECTION OF COKING IN THE INTAKE TRACT OF AN INTERNAL COMBUSTION ENGINE

CROSS REFERENCE TO RELATED APPLICATIONS

This application is a continuation of PCT International Application No. PCT/EP2013/065567, filed Jul. 24, 2013, which claims priority under 35 U.S.C. §119 from German Patent Application No. 10 2012 213 241.4, filed Jul. 27, 2012, the entire disclosures of which are herein expressly incorporated by reference.

BACKGROUND AND SUMMARY OF THE INVENTION

The invention relates to a method for detecting coking in the intake tract of an internal combustion engine having variable intake camshaft control, and to a corresponding engine testing device for detecting coking.

Coking of the intake tract can occur in gasoline engines having direct fuel injection, in particular on the intake valve (for example, on the valve neck) or in the intake port on the valve opening. With such coking, carbon deposits in the intake tract. The cause for the tendency of gasoline engines having direct fuel injection toward coking is that no continuous cleaning scavenging of the intake tract, for example of the intake valve, with gasoline takes place in engines having direct fuel injection, since the fuel is injected directly into the combustion chamber; oil residue from the crankcase breather can deposit, together with soot particles from the cylinder, in the intake in the form of carbon under the action of heat. The coking tendency increases when low-quality fuels are used and with low-load driving profiles.

This coking causes rough idling (uneven running) when the engine is cold and can result in increased fuel consumption as well as problems in the warm-up driving behavior. A carbon deposit coating at the top on the valve neck between the valve head and the valve stem, for example, can interfere with the tumble flow, so that the idle speed fluctuates to a higher degree and, in the extreme case, even misfires can occur. A carbon deposit coating can even result in performance losses when it acts as a flow resistance due to insufficient cylinder filling. Moreover, a carbon deposit coating on the intake valve or on the valve opening can prevent the valve from closing properly, resulting in compression losses and sporadic misfires. Coking of the intake tract, in particular of the intake valves, in internal combustion engines having direct fuel injection and the consequences thereof are described in the published prior art EP 1 884 637 A2.

The degree of coking in the intake tract is typically determined visually in the workshop only after engine components have been disassembled. If the intact tract exhibits coking, the intake tract is then cleaned or the components in question are replaced.

The visual detection of coking has the drawback of being very labor-intensive due to the disassembly of engine components for visual accessibility. Moreover, the visual inspection is associated with the drawback of a lack of objectivity, since coking is difficult to assess with a purely visual observation.

It is further known from the published prior art DE 199 58 177 A1 that the combustion chamber of an internal combustion engine can also be affected by coking. In connection with the coking of the combustion chamber, it is proposed to detect speed fluctuations of the internal combustion engine and, if the fluctuations in the idle speed are significant, to initiate cleaning of the combustion chambers of the engine.

It is the object of the invention to provide a method for detecting coking in the intake tract of an internal combustion engine having direct fuel injection, which does not require the internal combustion engine to be disassembled for detection and allows an objective assessment of the coking level. The object is further directed to providing an engine testing device having the appropriate properties.

This and other objects are achieved by the present invention.

A first aspect of the invention relates to the detection of coking in the intake tract of an internal combustion engine having direct fuel injection, in particular of a gasoline engine having direct fuel (gasoline) injection. For example, the method is carried out on a vehicle-external engine testing device, which is used in a vehicle repair shop, for example. The engine testing device is connected wirelessly or by wire to the engine control unit of the vehicle via an appropriate vehicle interface and, in this way, is able to control the operation of the vehicle and retrieve measurement values from the engine control unit. However, it is also contemplated for the method to be carried out on the engine control unit of the vehicle, wherein cleaning of the ports is ordered automatically, for example, when coking is detected. For this purpose, a cleaning notice may be issued to the driver or to a service technician in the workshop and/or an appropriate notice indicating coking may be stored in a fault memory of the vehicle. It would also be conceivable for automatic cleaning of the vehicle to be carried out when the engine control unit detects coking, for example by introducing cleaning liquid into the intake tract, or by switching the internal combustion engine to a cleaning operating mode.

The internal combustion engine further has variable intake valve control. This variable intake valve control system allows the opening time of the intake valves in relation to the crank angle of the crankshaft to be modified. For example, this is a variable camshaft control system, in which the position of the intake camshaft relative to the crankshaft is varied, in particular by way of what is known as a vane cell adjuster. It can also be a fully variable valve gear, in which the valve lift can be varied, in addition to the opening time of the intake valves.

In the method, the internal combustion engine is operated in idle at an idle speed that is increased compared to normal idle operation. It may be provided for this purpose that the internal combustion engine is initially operated in normal idle operating mode, for example at a rotational speed in the range of 700 to 900 rpm. For detecting coking, the idle speed is then increased, for example to an idle speed greater than 1200 rpm, in particular to a rotational speed of approximately 1500 rpm.

For conducting the measurement, additionally the opening timing of the intake valves is controlled to achieve an early timing event, whereby the valve overlap (the duration during which the intake valve is already open before the exhaust valve is closed) is increased. It is possible here to institute a particular setting for the opening time and then record the measurement values at this setting of the opening time of the intake valves. For example, a setting for the opening time is instituted, which is in the early half of the control range. It is possible to use a setting at which the intake valves already close just after bottom dead center or already before bottom dead center. However, it is also possible for the opening time to pass once, or multiple times, between advanced and retarded, and for measurement values to be recorded during each passage of the opening time. For example, measurement values in an evaluation window are used for determining a rough running characteristic, the center of gravity of which is, or which is entirely, in the early half of the maximum control range.

By way of the measurement, it is possible to determine a rough running characteristic of the internal combustion engine which is typical of the rough operation of the internal combustion engine. The presence of coking in the intake tract can then be detected based on the rough running characteristic.

The control of the opening time of the intake valves according to the invention to achieve an early timing event essentially increases rough running of the internal combustion engine. The difference in rough running of the internal combustion engine between the case where coking is present in the intake tract and the case where no coking is present thus becomes greater, whereby a distinction between coking and non-coking becomes easier, and coking can thereby be detected more reliably, and lower levels of intake valve coking can also be detected sooner. On the other hand, a higher idle speed should be used with an early opening time of the intake valves so as to prevent the internal combustion engine from stalling.

The method according to the invention allows coking to be objectively determined by measurement, instead of by subjective visual assessment. Cleaning or repairing only takes place when this is objectively truly necessary.

Disassembly of the engine solely for the visual coking assessment is not necessary when using the method. Coking can be determined very quickly by way of the method (for example, within 3 minutes instead of 1 hour or more when disassembling of the engine is necessary).

The rough running characteristic of the internal combustion engine can be compared to a comparison value. If the rough running characteristic increases as rough running increases, for example, it is possible, in particular when the rough running characteristic is greater than the comparison value, to determine that there is a high level of coking of the intake tract and/or a need for cleaning of the intake tract. However, if the rough running characteristic is smaller than the characteristic, there is no need to clean the intake tract.

If the rough running characteristic decreases as rough running increases, for example, it is possible, for example when the rough running characteristic is smaller than the comparison value, to determine that there is a high level of coking of the intake tract and/or a need for cleaning of the intake tract.

The rough running characteristic, the presence of a high level of coking, and/or a need for cleaning can be communicated, in particular visually, to the user of the engine testing device, for example, who will then carry out the cleaning of the intake tract.

Preferably, a cylinder-based rough running characteristic that is typical of the rough operation of a cylinder is determined for each cylinder. The (global) rough running characteristic for the entire internal combustion engine is then formed from the cylinder-based rough running characteristics. This can be done in particular by averaging of the rough running characteristics of the individual cylinders. By averaging the rough running characteristics of the individual cylinders, it is possible, based on the resulting rough running characteristics, to better infer the presence of coking in the intake tract. If the cylinder-based rough running characteristic of all cylinders indicates increased rough running, coking of the intake tract is typically present. If the rough running characteristic of an individual cylinder indicates increased rough running, but the rough running characteristics of the remaining cylinders do not indicate increased rough running, in most cases no coking of the intake tract is present; however, in this case, when averaging the rough running characteristics, the resulting rough running characteristic will precisely not indicate particularly high rough running, since the increase in the rough running characteristic of one cylinder influences the rough running characteristic of the internal combustion engine only by the factor 1/number of cylinders.

The above-described rough running characteristic of the internal combustion engine, in turn, can be an averaged rough running characteristic of the internal combustion engine, which results from averaging multiple rough running characteristics of the internal combustion engine during multiple measurement passes.

The cylinder-based rough running characteristic of each cylinder is preferably determined as a function of multiple rough running values that are based on the particular cylinder, which describe the rough running of the internal combustion engine during the phases of the particular cylinder (which is to say, during firing of the particular cylinder). A rough running value indicates, for example, whether the crankshaft is rotating more quickly or more slowly compared to a reference.

The rough running characteristic of a cylinder can be determined by averaging rough running values that are based on this cylinder. The rough running characteristic of a cylinder can be determined, for example, from the average value of the rough running values that indicate that the crankshaft is rotating more quickly, and from the average value of the rough running values that indicate that the crankshaft is rotating more slowly, for example by determining the difference between these two average values.

Preferably, the engine temperature (based on the temperature of the coolant, for example) is lower or lower than/equal to a temperature threshold value (for example, a temperature threshold value in the range of 30° C. to 50° C., in particular a temperature threshold value of 40° C.), at least during the start of the measurement, so that the measurement is meaningful. This is checked before the measurement, for example. If the engine temperature does not fulfill this condition prior to the measurement, preferably a rapid cool-down of the engine by way of the electric fan is carried out, wherein, for example, the measured temperature of the coolant can be cooled within 2 hours (instead of 8 hours) from 100° C., for example, to 30° C. It could also be provided that the engine temperature must be lower than or lower than/equal to a temperature threshold value during the entire measurement.

A second aspect of the invention is directed to an engine testing device. The engine testing device is configured as a test unit to detect coking in the intake tract of an internal combustion engine having direct fuel injection and variable intake valve control. The device can be connected to a motor vehicle for controlling the operation of the vehicle and for receiving vehicle-internal measurement values, for example via an electrical connection or a radio connection.

The engine testing device includes the test unit and interfaces configured to control the internal combustion engine via the engine control unit in such a way that the engine is operated in idle at an idle speed that is increased compared to normal idle operation. Via the engine control unit, the engine testing device controls the opening time of the intake valves to achieve an early timing event. The engine testing device further determines a rough running characteristic of the internal combustion engine which is typical of the rough operation of the internal combustion engine, wherein the presence of coking in the intake tract is detectable based on the rough running characteristic.

The above comments on the method according to the invention based on the first aspect of the invention apply accordingly to the engine testing device according to the invention based on the second aspect of the invention; advantageous embodiments of the engine testing device according to the invention correspond to the described advantageous embodiments of the method according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
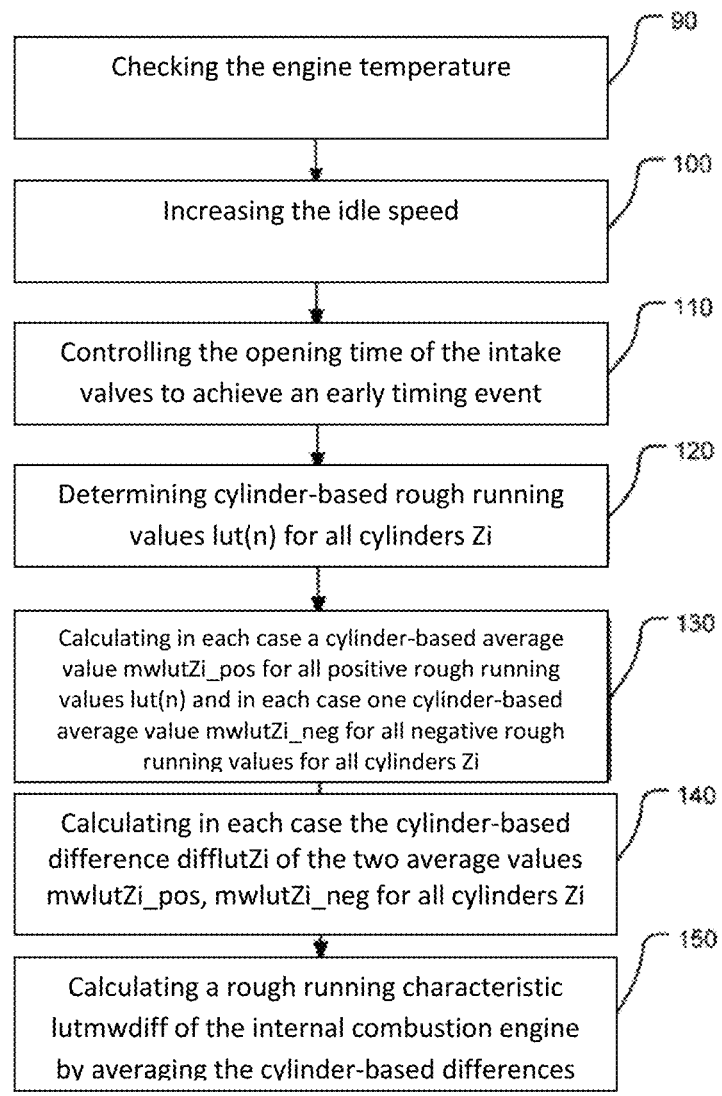
FIG. 1 is an exemplary flow chart for a method according to the invention for detecting coking in the intact tract of an internal combustion engine.

FIG. 1 shows an exemplary flow chart for a method according to the invention for detecting coking in the intact tract of an internal combustion engine. In step 90, it is checked whether the engine temperature is below a threshold value, for example below 40° C. If this is not the case, a rapid cool-down of the engine is carried out by way of the electric fan, so that the engine temperature has been lowered to a value below 40° C. before starting the measurement.

After it has been ensured that the temperature is below the threshold value, the idle speed is increased in step 100 from an idle speed that is typical in normal idle operation (for example 750 rpm) to an increased idle speed (for example 1500 rpm).

Figure 2:
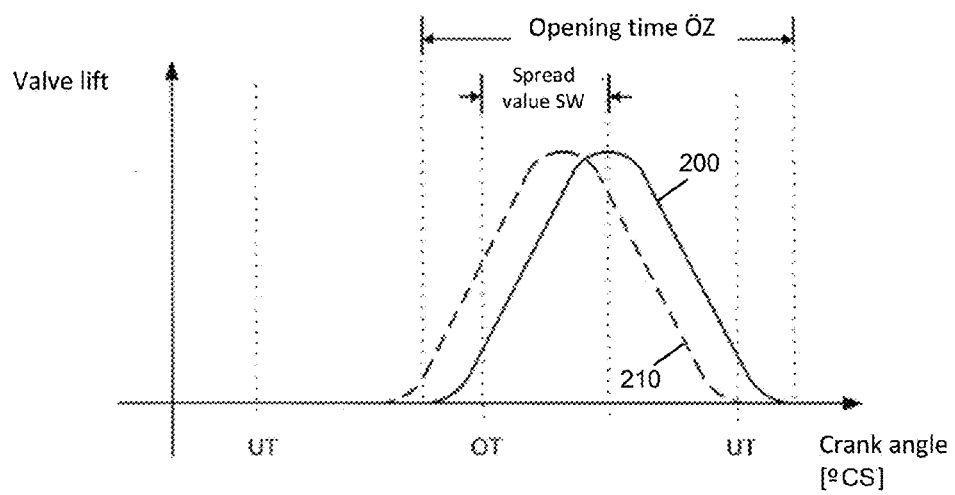
FIG. 2 is a graphical illustration for the definition of the intake spread value.

Furthermore, the opening time of the intake valves is controlled to achieve an early timing event (see step 110) by advancing the intake camshaft. Here, what is known as the spread value SW is reduced. The spread value SW describes the angle in ° CS (crankshaft) between top dead center and the crest of the valve lift curve of the intake valve. This is shown in FIG. 2. Curve 200 describes an exemplary valve lift curve for a center position of the intake camshaft. Dotted curve 210 describes an exemplary valve lift curve after an advance of the curve 200, wherein the opening time ÖZ (which is to say the time period between opening and closing of the intake valve) for curve 200 is chronologically before that for curve 210. FIG. 2 shows the spread value SW for curve 200 at the center position, which corresponds to the angle between top dead center and the crest of the valve lift curve.

The control of the opening time ÖZ to achieve an early timing event according to step 110 is carried out, for example, in that the opening time ÖZ is passed through multiple times from early to late by varying the spread value SW, and that measurement values are recorded during each passage of the opening time ÖZ. As an alternative, the opening time ÖZ could of course be fixed to an early position (which is to say the spread value SW could be set to a fixed value, for example a value in the range of 50° CS to 85° CS), and the measurement could be carried out in this position.

For passing through the opening time from late to early, the spread value SW is reduced, proceeding from a spread value $SW_4$ (corresponds to a late opening time ÖZ), to a spread value $SW_1$ that is lower (corresponds to an early opening time ÖZ). The spread value $SW_4$, for example, corresponds to the latest possible position of the opening time ÖZ that can be set with the intake valve gear of the engine, while the spread value $SW_1$, for example, corresponds to the earliest possible position of the opening time that can be set with the intake valve gear of the engine. For example, proceeding from $SW_4=120°$ CS, the spread value SW is reduced to a spread value $SW_1=50°$ CS, wherein a control range of 70° CS is obtained. The passed-through value range of the spread value SW from $SW_1$ to $SW_4$ is shown as the x-axis in FIG. 3.

The spread value SW is preferably passed through in step 110 not only once, but multiple times from $SW_4$ to $SW_1$.

When passing through, so-called segment times are recorded by way of transducer wheel measurement. A segment time corresponds to the time at which the crankshaft exceeds a predetermined crankshaft angle range. Here, for example, a crankshaft angle range, in which the cylinder fires and which is referred to as a segment, is assigned to every cylinder. Based on the segment times, rough running values can be calculated for the individual cylinders (see step 120 in FIG. 1). The calculation of rough running values is described in the published prior art DE 198 14 732 A1, for example, the disclosure of which is hereby incorporated by reference herein Rough running values lut(n) can be calculated in the following manner, for example:

$$lut(n) = \frac{ts(n+1) - ts(n)}{ts(n)^3} - K$$

Here, lut(n) describes a rough running value for the firing cycle n of a four-cylinder engine, for example. The variable ts(n) describes the segment time at the firing cycle n; ts(n+1) describes the segment at the firing cycle n+1. The variable K corresponds to a correction value K, in particular for dynamic compensation.

Figure 3:
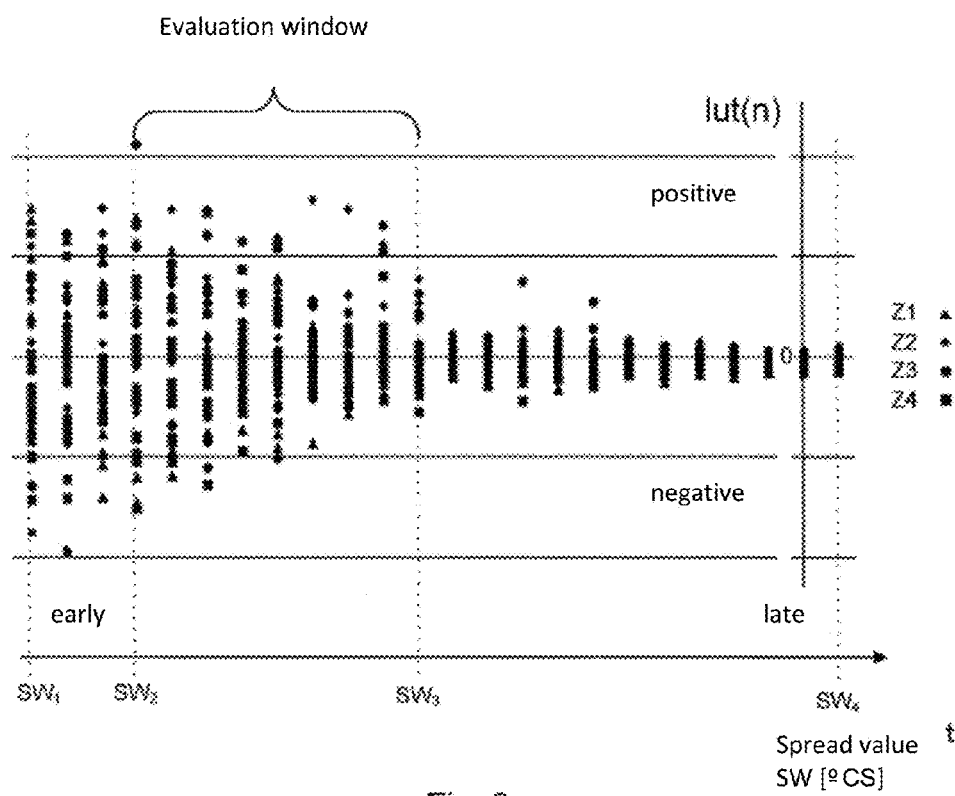
FIG. 3 is a graphical illustration of measured rough running values for four different cylinders Z1, Z2, Z3 and Z4 plotted over the spread angle SW.

Every rough running value lut(n) is assigned to the cycle of a particular cylinder, and thus to a particular cylinder, as a function of the firing order of the cylinders. FIG. 3 shows exemplary rough running values for cylinders Z1, Z2, Z3 and Z4 of a four-cylinder internal combustion engine over the spread value SW, which is to say over the camshaft position. The rough running values lut(n) can assume either positive or negative values. A rough running value of zero corresponds to a smooth engine operation. At a positive value lut(n), the engine rotates too slowly in the assigned segment n; at a negative value lut(n), the engine rotates too quickly in the assigned segment n.

The rough running values lut(n) shown in FIG. 3 are determined by passing through the spread value SW from $SW_4$ to $SW_1$ multiple times and are stored individually for each cylinder.

The rough running values lut(n) form a funnel shape, wherein the amount and thus the funnel width tends to become smaller as the spread value SW increases (which is to say as the shift in the opening time toward late increases), and tends to become larger as the spread value SW decreases (which is to say as the shift in the opening time toward early increases). The rough running of the internal combustion engine also tends to increase when the opening time is shifted toward early. The use of rough running values lut(n) having a more advanced position of the camshaft, for example up to 85° CS, is suitable for the method according to the invention for detecting coking, since with a more advanced position of the camshaft the difference in the rough running of the internal combustion engine is greater between the case where the intake tract is coked and the case where it is not coked, whereby a distinction between coking and non-coking is easier. This increases the robustness of the measuring method.

In the following steps, only the rough running values lut(n) in an evaluation window from $SW_2$ to $SW_3$ are taken into consideration, for example from $SW_2$=60° CS to $SW_3$=85° CS, for determining a rough running characteristic. The focus of the evaluation window is preferably on the early half of the maximum control range, and preferably the entire evaluation window is in the early half of the maximal control range. In the example of FIG. 3, the early half of the maximal control range extends from SW=50° CS to SW=85° CS, and the late half of the maximal control value extends from 85° CS to 120° CS, wherein in the case of an evaluation window of $SW_2$=60° CS to $SW_3$=85° CS the entire evaluation window is in the early half of the maximal control range.

So as to calculate a rough running characteristic of the engine, a cylinder-based average value mwlutZipos is calculated for all rough running values of a cylinder Zi in the evaluation window which are greater than 0 (see step 130 in FIG. 1). This happens in each case for all cylinders Zi where i=1, 2, 3, and 4, for example.

Similarly, the cylinder-based average value mwlutZi_neg is calculated for all rough running values of a cylinder Zi in the evaluation window which are smaller than 0. This is also done for every cylinder Zi.

Based on the average values, it is possible to calculate, individually for every cylinder Zi, the difference diflutZi between the positive average value mwlutZi_pos of the cylinder Zi and the negative average value mwlutZi_neg of the cylinder Zi (see step 140 in FIG. 1). The difference diflutZi is also calculated in each case for all cylinders Zi. The difference value diflutZi indicates how wide the funnel in FIG. 3 is on average for the particular cylinder Zi in the selected evaluation window.

In step 150, a rough running characteristic lutmwdiff of the internal combustion engine is determined by averaging the cylinder-based values difflutZi across all the cylinders Zi.

Optionally, it is possible to determine multiple measurement values in consecutive measurements for the rough running characteristic lutmwdiff (for example, by carrying out steps 110 to 150 multiple times) and to average the multiple measurement values, wherein then the averaged variable is used as the rough running characteristic for detecting the coking in the intake tract.

Based on the rough running characteristic lutmwdiff (or the averaged rough running characteristic), it is then possible to detect coking in the intake tract. If the rough running characteristic lutmwdiff (or the averaged rough running characteristic) is greater than a critical value, this indicates coking of the intake tract, and cleaning of the intake tract is necessary. If the rough running characteristic lutmwdiff (or the averaged rough running characteristic) is smaller than a critical value, the intake tract is not significantly coked, and cleaning is not necessary.

The critical value can be obtained based on an empirical measurement of a sufficiently large number of vehicles.

Figure 4:
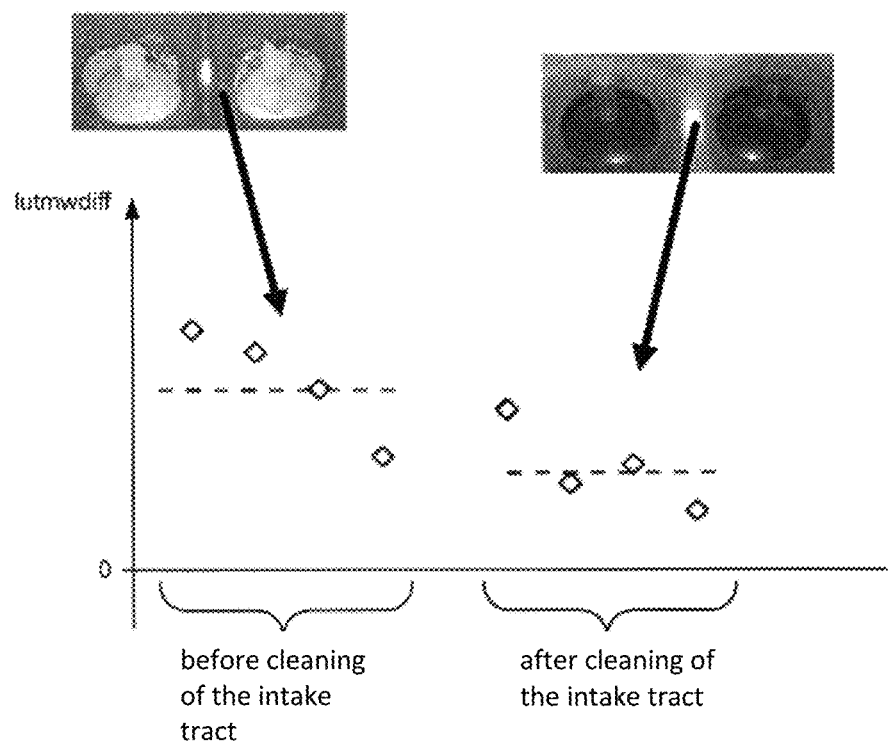
FIG. 4 shows measurement results for the rough running characteristic lutmwdiff before and after cleaning of the intake tract.

FIG. 4 shows in each case four measurement values for the rough running characteristic lutmwdiff before and after cleaning of the intake tract. The dotted lines in each case identify the average value of the respective four measurement values. As can be seen based on FIG. 4, the average value of lutmwdiff before cleaning of the intake tract is almost twice as high as after cleaning of the intake tract. It is further apparent that the measurement values for the rough running characteristic become increasingly smaller before cleaning and thereby lose meaningfulness. The cause for this is the increased engine temperature, since the engine temperature was below the threshold temperature of 40° C., for example, only before the start of the measurement of the first measurement value, while during subsequent measurements the temperature rose due to slow heating of the engine. The values for lutmwdiff are therefore a function of the temperature. When starting the first measurement, it should preferably be ensured that the starting temperature is below the threshold temperature of 40° C., for example. The measurements are then particularly meaningful.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for detecting coking in an intake tract of an internal combustion engine having direct fuel injection and variable intake valve control, the method comprising the acts of:
   operating the internal combustion engine in idle at an idle speed that is increased compared to normal idle operation;
   controlling an opening time of the intake valves to achieve an early timing event;
   determining a rough running characteristic of the internal combustion engine which is typical of rough operation of the internal combustion engine, wherein presence of coking in the intake tract is detectable based on the determined rough running characteristic; and
   issuing a notice based on the determined rough running characteristic, the notice including at least one of notice of the presence of the rough running characteristic, notice of the presence of coking, and notice of a need for intake tract cleaning, wherein the notice is issued to at least one of
   an operator of the internal combustion engine,
   a user operating an engine testing device,
   a controller fault memory for storage and subsequent retrieval, and
   a controller configured to initiate automatic intake tract cleaning.

2. The method according to claim 1, wherein the increased idle speed is greater than 1200 rpm.

3. The method according to claim 1, wherein the increased idle speed is approximately 1500 rpm.

4. The method according claim 1, wherein the act of determining the rough running characteristic further comprises:

determining, for each cylinder, a cylinder-based rough running characteristic that is typical of the rough operation of a cylinder, the rough running characteristic of the internal combustion engine being determined based on the cylinder-based rough running characteristics.

5. The method according to claim 4, wherein the rough running characteristic of the internal combustion engine is determined from the cylinder-based rough running characteristic by averaging.

6. The method according to claim 5, wherein the cylinder-based rough running characteristic of every cylinder is determined as a function of multiple rough running values that are based on the particular cylinder and describe a rough operation of the internal combustion engine in cycles of the particular cylinder.

7. The method according to claim 6, further comprising the act of:
    detecting the presence of coking by comparing the rough running characteristic to a comparison value.

8. The method according to claim 7, further comprising the act of:
    checking whether an engine temperature is lower than or lower than/equal to a threshold temperature.

9. The method according to claim 4, wherein the cylinder-based rough running characteristic of every cylinder is determined as a function of multiple rough running values that are based on the particular cylinder and describe a rough operation of the internal combustion engine in cycles of the particular cylinder.

10. The method according to claim 1, further comprising the act of:
    detecting the presence of coking by comparing the rough running characteristic to a comparison value.

11. The method according to claim 10, wherein cleaning or a replacement of an engine component in question is carried out, or is not carried out, as a function of the comparison.

12. The method according to claim 10, further comprising the act of:
    checking whether an engine temperature is lower than or lower than/equal to a threshold temperature.

13. The method according to claim 1, further comprising the act of:
    checking whether an engine temperature is lower than or lower than/equal to a threshold temperature.

14. An engine testing device for detecting coking in an intake tract of an internal combustion engine of a motor vehicle having direct fuel injection and variable intake valve control, comprising:
    a test unit connectable to a motor vehicle for controlling operation of the vehicle and for receiving vehicle-internal measurement values, the test unit being operatively configured to:
        operate the internal combustion engine in idle at an idle speed that is increased compared to normal idle operation;
        control an opening time of the intake valves to achieve an early timing event;
        determine a rough running characteristic of the internal combustion engine which is typical of rough operation of the internal combustion engine, wherein presence of coking in the intake tract is detectable based on the rough running characteristic;
        issue a notice based on the determined rough running characteristic, the notice including at least one of notice of the presence of the rough running characteristic, notice of the presence of coking, and notice of a need for intake tract cleaning, wherein the notice is issued to at least one of
        an operator of the internal combustion engine,
        a user operating an engine testing device,
        a controller fault memory for storage and subsequent retrieval, and
        a controller configured to initiate automatic intake tract cleaning.

\* \* \* \* \*